(12) United States Patent
Tsukamoto

(10) Patent No.: US 6,299,976 B1
(45) Date of Patent: Oct. 9, 2001

(54) MATERIALS USED IN GLAND PACKING MADE FROM EXPANSIVE GRAPHITE, GLAND PACKING MADE FROM EXPANSIVE GRAPHITE MADE FROM THE MATERIALS, AND A PRODUCING METHOD OF GLAND PACKING MADE FROM EXPANSIVE GRAPHITE

(76) Inventor: Katsuro Tsukamoto, c/o Japan Matex Kabushiki Kaisha, of 3-20, Ebie 5-chome, Fukushima-ku, Osaka City, Osaka (JP)

( * ) Notice: Subject to any disclaimer, the term of this patent is extended or adjusted under 35 U.S.C. 154(b) by 0 days.

(21) Appl. No.: 09/565,860

(22) Filed: May 6, 2000

(30) Foreign Application Priority Data

May 14, 1999 (JP) .................................................. 11-134505

(51) Int. Cl.⁷ ....................................................... B01F 6/00
(52) U.S. Cl. ........................................... 428/364; 428/377
(58) Field of Search .................................. 428/357, 367, 428/370, 377; 277/537, 539, 106

(56) References Cited

U.S. PATENT DOCUMENTS

| | | | |
|---|---|---|---|
| 5,225,262 | * 7/1993 | Leduc | 428/377 |
| 5,240,769 | * 8/1993 | Ueda et al. | 428/377 |
| 5,281,475 | * 1/1994 | Hollenbaugh et al. | 428/377 |
| 5,288,552 | * 2/1994 | Hollenbaugh et al. | 428/364 |
| 5,364,699 | * 11/1994 | Hollenbaugh et al. | 428/377 |
| 5,542,680 | * 8/1996 | Hutchen et al. | 277/106 |

FOREIGN PATENT DOCUMENTS

2000320681A * 11/2000 (JP) .

* cited by examiner

*Primary Examiner*—Newton Edwards
(74) *Attorney, Agent, or Firm*—Curtis L. Harrington

(57) ABSTRACT

The present invention relates to the materials used in a gland packing made from expansive graphite, the gland packing made from expansive graphite using the materials and a producing method of the gland packing made from expansive graphite, with producing facility in addition to sealing ability, heat resistance, chemical resistance and such properties and with causing no electrolytic corrosion to shaft and apparatus casing, and braiding thread which constructs these is braiding thread wherein a strip laminated sheet comprising an expansive graphite sheet laminated with a film made from polytetrafluoroethylene on one side thereof and is set with polyvinylalcohol layer on the other side thereof, is twist processed so that the film made from polytetrafluoroethylene positions on the outside.

8 Claims, 9 Drawing Sheets

MATERIALS USED IN GLAND PACKING MADE FROM EXPANSIVE GRAPHITE, GLAND PACKING MADE FROM EXPANSIVE GRAPHITE MADE FROM THE MATERIALS, AND A PRODUCING METHOD OF GLAND PACKING MADE FROM EXPANSIVE GRAPHITE

BACKGROUND OF THE INVENTION

1. Field of the Invention

The present invention relates to materials used in a gland packing made from expansive graphite, the gland packing made from expansive graphite made from the materials and a producing method of gland packing made from expansive graphite, and more particularly, it relates to the materials used in a gland packing with producing facility in addition to sealing ability, heat resistance, chemical resistance and such properties and without causing electrolytic corrosion to a shaft and an apparatus casing, made from expansive graphite, the gland packing made from expansive graphite made from the materials and a producing method of gland packing made from expansive graphite.

In the specification, allowable tensile force means the product of a tensile strength of the materials, and the cross-sectional area of the materials in a case of the materials resulting in a fracture.

2. Description of the Related Art

As a packing which carries out a shaft sealing of fluid apparatus, there have been a gland packing made from expansive graphite hitherto. The gland packing made from expansive graphite is packed in a room which is formed in-between a shaft and an apparatus casing, i.e., the inside of staffing box, in order to prevent fluid from leaking out from in-between the shaft and the apparatus casing.

Expansive graphite surpasses in lubricating ability, heat resistance, chemical resistance and such properties, but on the other hand, it has defects that its tensile strength is weak and also is fragile. Thus, when constructing a sheet from expansive graphite and twist processing such sheet, there have been many circumstances wherein said sheet fractures due to a big tensile force reacted thereto. From such reasons, there have been a few circumstances wherein a gland packing made from expansive graphite is constructed from expansive graphite by itself, and it is usually produced in a form which is reinforced with other materials.

As for a gland packing made from expansive graphite which has a reinforced structure, the following has been suggested.

For example, a gland packing made from expansive graphite wherein: a laminated sheet is constructed by laminating a cotton threaded fabric sheet on one surface of expansive graphite sheet; a strip laminated sheet is formed by cutting such laminated sheet; braiding thread is constructed by a twist processing of such laminated sheet so that the strip laminated sheet covers a reinforcing wire and that the expansive graphite sheet positions on the outside; and after this, such braiding thread is braided into a gland packing made from expansive graphite, is suggested.

In this example, when twist processing the laminated sheet and braiding the braiding thread, tensile force reacts to the expansive graphite sheet. However, the expansive graphite sheet will not fracture because it is reinforced with the cotton threaded fabric sheet.

However, with the above mentioned prior art, there were some problems that follow.

That is, since tensile strength of cotton thread is not very high, in order for the cotton threaded fabric sheet to function sufficiently as a reinforcing material, it was necessary to have the sectional area of said sheet bigger. To hitherto correspond to this necessity, the width of cotton threaded fabric sheet was widened by winding the width of strip laminated sheet. However, it was difficult to gain braiding thread of good quality from the laminated sheet with such width. This was because the flexibility of the laminated sheet gets lower as the width of thereof becomes over 10 mm, causing a difficulty in a twist processing. Further, the braiding thread gained in such way was inferior in flexibility, causing a difficulty when braiding thereof.

Furthermore, the gland packing made from expansive graphite which was gained by braiding with this braiding thread is also inferior in flexibility. If such gland packing made from expansive graphite with low flexibility was packed in the stuffing box, it might not be possible to secure sufficient sealing ability, even when the gland was bound tightly.

Also, the expansive graphite positioned on the outside of the gland packing made from expansive graphite. From doing this, the expansive graphite was touching to the shaft and the apparatus casing. The expansive graphite is a conductive material, and the shaft and the apparatus casing are also constructed with conductive materials such as metals. Therefore, an electric potential difference is created between the expansive graphite and the shaft, and between the expansive graphite and the apparatus casing, thus, there might be a risk of generating a electrolytic corrosion.

BRIEF SUMMARY OF THE INVENTION

The present invention has invented under such actual circumstances, and aims to offer the materials used in a gland packing made from expansive graphite, the gland packing made from expansive graphite using the materials and a producing method of the gland packing made from expansive graphite, with producing facility in addition to sealing ability, heat resistance, chemical resistance and such properties and with causing no electrolytic corrosion to a shaft and an apparatus casing.

The present invention as set forth in claim 1 is braiding thread used in a gland packing made from expansive graphite which is gained by a pressure forming of a cord body constructed by braiding with the braiding thread wherein: a strip laminated sheet comprising an expansive graphite sheet laminated with a film made from polytetrafluoroethylene on one side thereof and is set with a polyvinylalcohol layer on the other side thereof is twist processed so that the film made from polytetrafluoroethylene positions on the outside.

The present invention as set forth in claim 2 is braiding thread used in a gland packing made from expansive graphite which is gained by a pressure forming of a cord body constructed by braiding with the braiding thread wherein: a strip laminated sheet comprising an expansive graphite sheet laminated with a polyvinylalcohol layer at least on one side thereof, is twist processed so that the polyvinylalcohol layer positions on the outside.

The present invention as set forth in claim 3 is braiding thread as set forth in claim 1, wherein said strip laminated sheet is twist processed so that said laminated sheet covers a reinforcing wire.

The present invention as set forth in claim 4 is braiding thread as set forth in claim 2, wherein said strip laminated sheet is twist processed so that said laminated sheet covers a reinforcing wire.

The present invention as set forth in claim 5 is braiding thread used in a gland packing made from expansive graphite which is gained by a pressure forming of a cord body constructed by braiding with the braiding thread wherein: a strip laminated sheet is twist processed so that said laminated sheet wherein a film made from polytetrafluoroethylene is laminated at least on one side of the expansive graphite sheet covers a reinforcing wire with the film made from polytetrafluoroethylene positioning on the outside.

The present invention as set forth in claim 6 is braiding thread used in a gland packing made from expansive graphite which is gained by a pressure forming of a cord body constructed by braiding with the braiding thread wherein: a strip film made from polytetrafluoroethylene is twist processed so that it covers a twist processed body of a rolled material which is gained by rolling a strip expansive graphite sheet together with a reinforcing wire.

The present invention as set forth in claim 7 is braiding thread used in a gland packing made from expansive graphite which is gained by a pressure forming of a cord body constructed by braiding with the braiding thread wherein: a strip film made from polytetrafluoroethylene is twist processed so that it covers a twist processed body of a strip laminated sheet wherein at least one side of the expansive graphite sheet is set with a polyvinylalcohol layer.

The present invention as set forth in claim 8 is a cord body wherein braiding thread set forth in claim 1 is braided.

The present invention as set forth in claim 15 is a cord body wherein braiding thread set forth in claim 1 is braided, and said polyvinylalcohol layer is removed after said braiding processing.

The present invention as set forth in claim 18 is a cord body set forth in claim 15, wherein more than one or two of liquid resin selected from a group comprising fluorocarbon resin like polytetrafluoroethylene resin and such, silicone resin, water-soluble phenolic resin, and emulsion resin including inorganic pulverized powder such as glass, alumina, silica gel, graphite and titanium, are impregnated.

The present invention as set forth in claim 21 is a gland packing made from expansive graphite which is produced by a pressure forming of a cord body set forth in claim 8.

The present invention as set forth in claim 34 is a producing method of gland packing made from expansive graphite wherein: a laminated sheet is constructed by laminating a film made from polytetrafluoroethylene on one side of an expansive graphite sheet and forming a polyvinylalcohol layer on the other side; a strip laminated sheet is formed by cutting this laminated sheet; braiding thread is constructed by a twist processing of this strip laminated sheet so that the film made from polytetrafluoroethylene positions on the outside; a cord body is constructed by braiding with this braiding thread; after elusively removing polyvinylalcohol layer from said cord body by a water bathing of the cord body, the cord body is dried; and after this, the cord body is pressure formed.

The present invention as set forth in claim 35 is a producing method of gland packing made from expansive graphite as set forth in claim 2, wherein: after drying the cord body which has been elusively removed, more than one or two of liquid resin selected from a group comprising fluorocarbon resin like polytetrafluoroethylene resin and such, silicone resin, water-soluble phenolic resin, and emulsion resin including inorganic pulverized powder such as glass, alumina, silica gel, graphite and titanium, are impregnated; and after this, the cord body is pressure formed.

The present invention as set forth in claim 36 is a producing method of gland packing made from expansive graphite wherein: a strip laminated sheet is formed by cutting a laminated sheet wherein a polyvinylalcohol layer is set at least on one side of an expansive graphite sheet; braiding thread is constructed by a twist processing of this strip laminated sheet so that said laminated sheet covers a reinforcing wire, and that the polyvinylalcohol layer positions on the outside; a cord body is constructed by braiding with this braiding thread; and after this, this cord body is pressure formed.

The present invention as set forth in claim 37 is a producing method of gland packing made from expansive graphite wherein: a strip laminated sheet is constructed by cutting a laminated sheet wherein a film made from polytetrafluoroethylene is laminated at least on one side of an expansive graphite sheet; braiding thread is constructed by a twist processing of this strip laminated sheet so that said laminated sheet covers a reinforcing wire, and that the film made from polytetrafluoroethylene positions on the outside; a cord body is constructed by braiding with this braiding thread; and after this, this cord body is pressure formed.

DESCRIPTION OF PREFERRED
EMBODIMENTS OF THE INVENTION

The gland packing made from expansive graphite set forth in the first embodiment of the present invention and the materials used will be explained with a reference made to the drawings.

Figure 1:
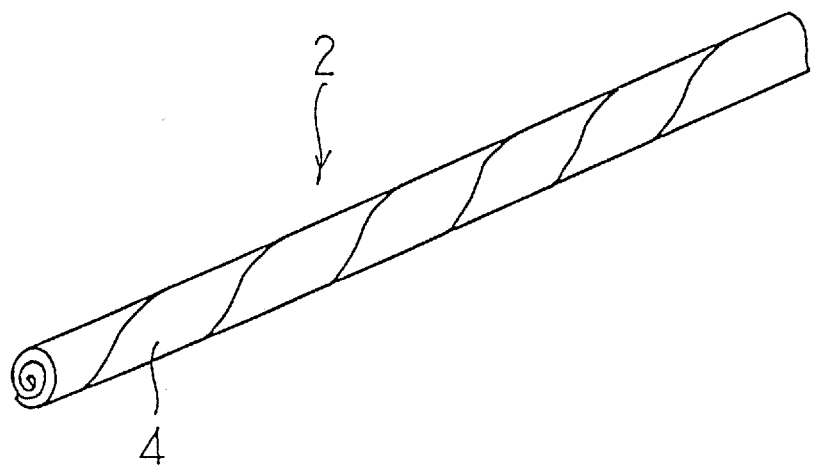
FIG. 1 is a perspective view showing braiding thread of the first embodiment of the present invention.
Figure 2:
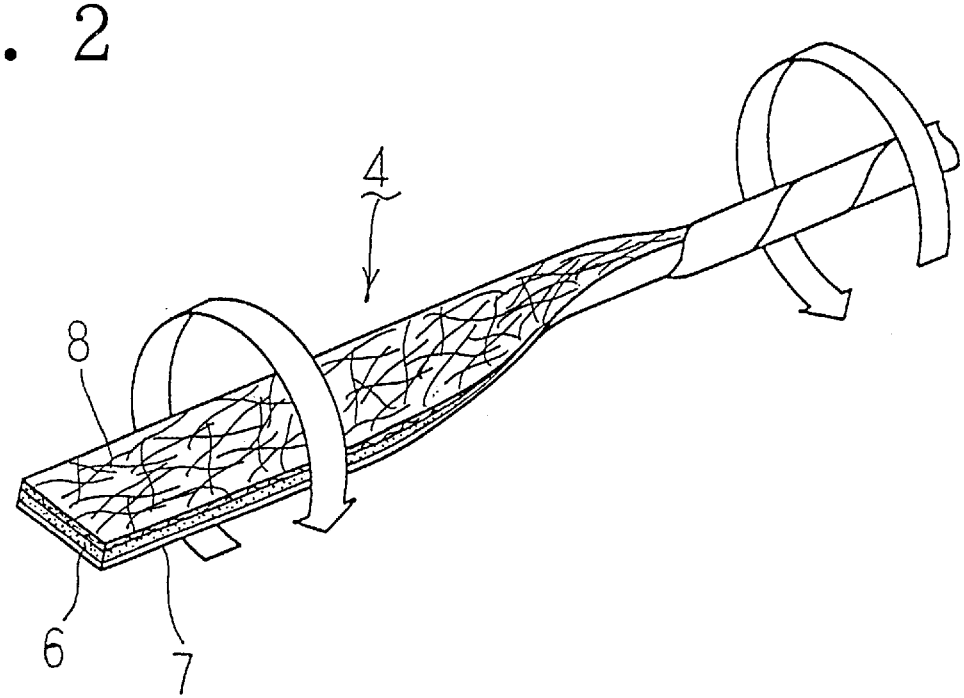
FIG. 2 is a view illustrating a producing process of the braiding thread shown in FIG. 1.
Figure 3:
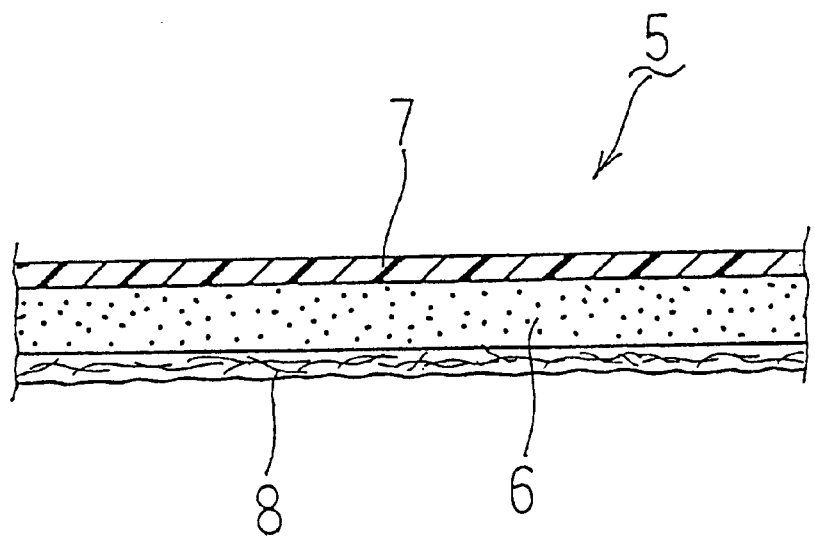
FIG. 3 is a sectional view showing a laminated sheet of the first embodiment of the present invention.
Figure 4:
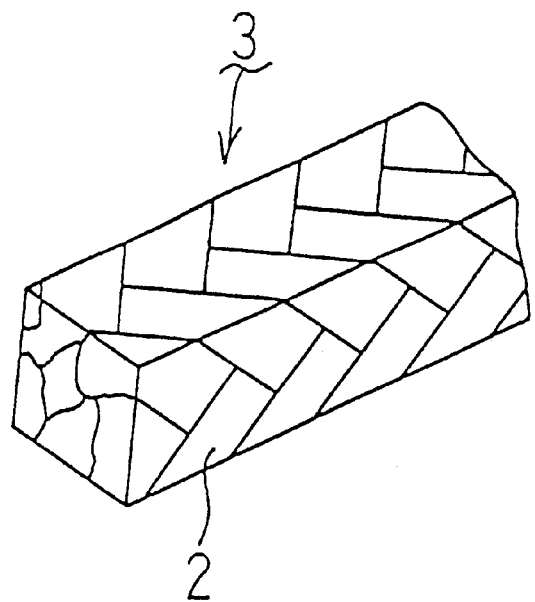
FIG. 4 is a perspective view showing a cord body of the first embodiment of the present invention.
Figure 5:
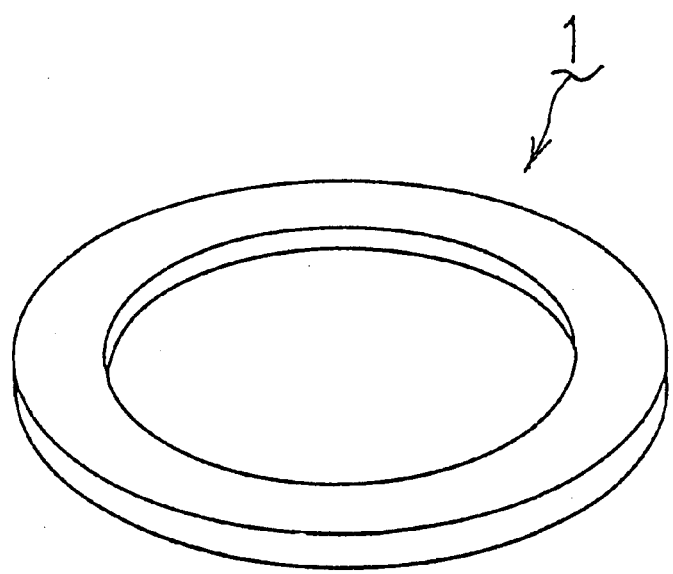
FIG. 5 is a perspective view showing a gland packing made from expansive graphite set forth in the first embodiment of the present invention.

FIG. 1 is a perspective view showing braiding thread of the first embodiment. FIG. 2 is a view showing a producing process of the braiding thread shown in FIG. 1. FIG. 3 is a sectional view showing a laminated sheet of the first embodiment. FIG. 4 is a perspective view showing a cord body of the first embodiment. FIG. 5 is a perspective view showing a gland packing made from expansive graphite which is constructed from the cord body shown in FIG. 4.

The gland packing made from expansive graphite set forth in the first embodiment (referred to as a packing hereinafter) (1) can be gained by pressure forming a cord body (3) which is constructed by braiding with braiding thread (2).

These structural elements will be explained successively in detail hereinafter.

The braiding thread (2) is constructed by twist processing a strip laminated sheet (4).

This strip laminated sheet (4) is formed by cutting a laminated sheet (5) shown in FIG. 3 into strips. The laminated sheet (5) comprises an expansive graphite sheet (6) wherein one side thereof is laminated with a film made from polytetrafluoroethylene (referred to as a film made from PTFE hereinafter)(7) and the other side thereof is set like a nonwoven fabric with a polyvinylalcohol layer (referred to as a PVA layer hereinafter)(8).

As for the expansive graphite sheet (6), after making a interlayer compound by reacting graphite powder, such as natural graphite and kish graphite, with concentrated sulfuric acid, concentrated nitric acid and such, the residue of the compound is gained by a water bathing and is expanded by a quick heating, so that expansive graphite can be gained and that expansive flexible graphite is molded with compression with a rolling material and such to be in a sheet-shape for a usage.

The concentration of expansive graphite sheet (6) is not particularly restricted, but it is preferred to be 0.80~2.2 g/cm$^3$. When the concentration is in this range, unevenness in crystal level is formed on the surface of expansive graphite sheet (6), causing an anchor effect to the laminated material thereon. Comparatively speaking, when the concentration is less than 0.80 g/cm$^3$, texture of organization becomes too rough, leading a lowering of sealing ability of a packing being made. On the other hand, when the concentration is more than 2.2 g/cm$^3$, the texture of organization becomes too fine to cause an anchor effects and to satisfactorily laminate a film made from PTFE (7) and a PVA layer (8).

Furthermore, the thickness of the expansive graphite sheet (6) is not particularly restricted, but it is preferred to be about 0.10~1.5 mm. When the thickness is less than 0.10 mm, the outstanding heat resistance, corrosion resistance, and abrasion resistance of the expansive graphite cannot be manifested. On the other hand, when the thickness is over 1.5 mm, the brittleness of the expansive graphite will be manifested.

The film made from PTFE (7) is to reinforce the expansive graphite sheet (6). This film made from PTFE (7) is laminated on a surface of the expansive graphite sheet (6). A laminating method is not particularly restricted, but as an example, methods using adhesive agents or heat fusion films can be adopted. As for heat fusion films, polyethylene film, olefinic film and polyurethane film can be given as example.

The film made from PTFE (7) can reinforce the expansive graphite sheet (6) because it surpasses in mechanical strength. Also, since the film made from PTFE (7) has outstanding lubricating ability, a packing (1) which surpasses in lubricating ability can be gained by constructing braiding thread (2) with this film positioning on the outside. Further, since the film made from PTFE (7) surpasses in electrical insulating ability, constructing the braiding thread (2) with this film positioning on the outside can prevent electrolytic corrosion of the shaft and the apparatus casing. Furthermore, since the film made from PTFE (7) surpasses in corrosion resistance and abrasion resistance, it can be proof against long term usage even under a harsh environment, such as at a chemical plant.

Additionally, as for the film made from PTFE (7), a porous film having fine pores of about 0.05~15 $\mu$m in diameter is desirable. The reason is that the porous film made from PTFE (7) can be satisfactorily laminated with the expansive graphite sheet (6).

As for the porous film made from PTFE (7), a film with its percentage of voids to be 25~95% which can be gained by a quick stretch after compressed molding powder of PTFE resin together, can be suitably used.

The PVA layer (8) is to reinforce the expansive graphite sheet (6). This PVA layer (8) is laminated like a nonwoven fabric on the other side of the expansive graphite sheet (6). The nonwoven fabric-like PVA layer (8) is comprised of PVA resin fibers stretching toward irregular directions which are laminated and these resin fibers are made into a sheet by being alternately adhered. The PVA layer (8) with such structure has great tensile strength against tensile force in any directions, and especially in a condition where the layer is processed to be made into strips, it shows great tensile strength against tensile force in an axial direction.

A laminated sheet (5) is constructed by laminating such film made from PTFE (7) and the PVA layer (8) onto the expansive graphite sheet (6). A strip laminated sheet (4) is formed by cutting the laminated sheet (5) into strips. The width of strip laminated sheet (4) should be 5~30 mm, preferably, 5~25 mm. When the width of thereof becomes over 30 mm, the flexibility of strip laminated sheet (4) gets lower, causing the braiding thread to become hard to process. On the other hand, when the width becomes less than 5 mm, the allowable tensile force is extremely dropped, causing a risk of the braiding thread (2) to fracture while processing. If the width of strip laminated sheet (4) is 5~30 mm, the strip laminated sheet (4) has enough allowable tensile force, thus, there will be no risk of fracture during a twist processing.

Additionally, the strip laminated sheet (4) is reinforced with the film made from PTFE (7) and the PVA layer (8), it can be formed comparatively thin. Therefore, not only the strip laminated sheet (4) with its width over 10 mm can ensure sufficient flexibility.

The braiding thread (2) is formed by a twist processing of this strip laminated sheet (4).

The preferable numbers of twist is about 55~70 twists per 1 m. With this number of twists, the inventor has determined that the strength of braiding thread (2) becomes extremely high. Further, the strip laminated sheet (4) is twist processed so that the film made from PTFE (7) positions on the outside. In this case, as mentioned afterwards, the film made from PTFE (7) can be positioned on the surface of the packing (1). Therefore, it becomes possible to gain the packing (1) with outstanding lubricating ability, abrasion resistance and corrosion resistance. Also, since the film made from PTFE (7) surpasses in electrical insulating ability, it is possible to gain the packing (1) with outstanding electrical insulating ability, preventing electrolytic corrosion of the shaft and the apparatus casing.

Since the braiding thread (2) surpasses in flexibility, a complicated braiding processing can easily be carried out, and even when carrying out a complicated processing, the laminated sheet (4) does not fracture. Also, there is no risk of fracturing during a braiding processing because the strip laminated sheet (4) which constructs the braiding thread (2) has enough allowable tensile force.

Figure 6:
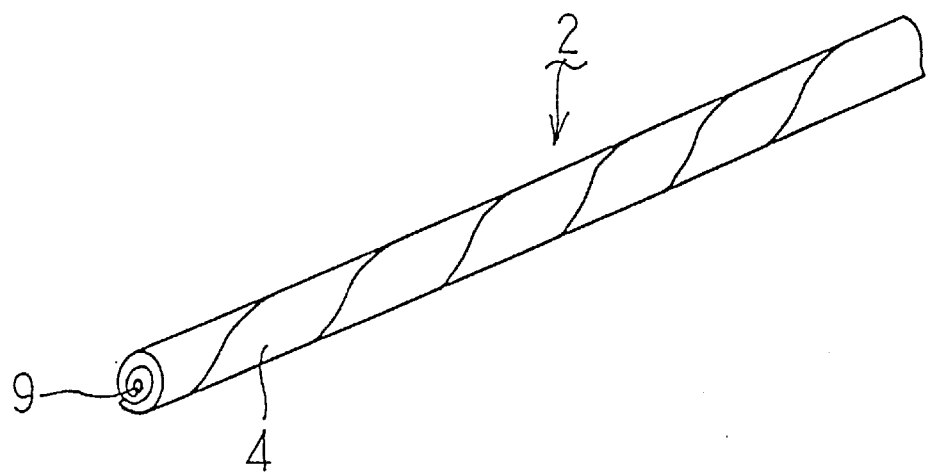
FIG. 6 is a perspective view showing an application example of the braiding thread of the first embodiment of the present invention.
Figure 7:
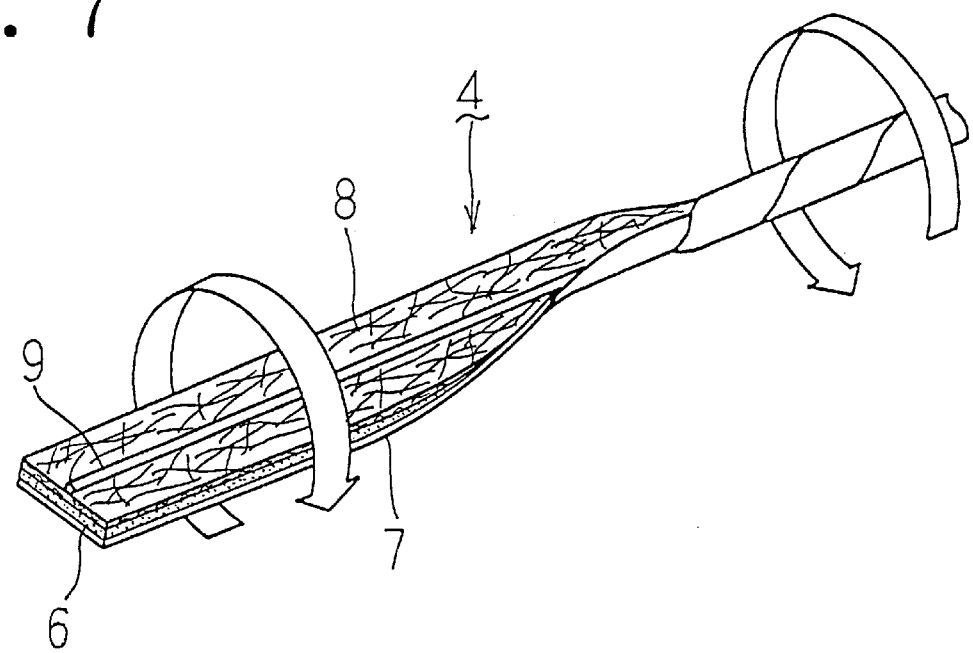
FIG. 7 is a view illustrating a producing process of the braiding thread shown in FIG. 6.

Furthermore, the braiding thread (2), as shown in FIG. 6 and FIG. 7, can comprise a structure with a reinforcing wire (9). Concretely speaking, it can comprise a structure wherein the strip laminated sheet (4) is twist processed so that the strip laminated sheet (4) covers the reinforcing wire (9). In such case, allowable tensile force of the braiding thread (2) can be improved more when compared to only comprising the strip laminated sheet (4) itself.

The quality of the reinforcing wire (9) is not particularly restricted, but any materials can suitably be used if it has necessary strength as a material for packing, such as, for example, metals such as Monel metal, inconel, stainless steel, copper and aluminium, synthetic resin such as carbon fiber, glass fiber, ceramic fiber, aramid fiber soaked with lubricating oil and PTFE fiber.

It is preferable for the reinforcing wire (9) to have its diameter below 3 mm. If the diameter is as mentioned, a twist processing of the strip laminated sheet (4) can easily be carried out.

Additionally, only one piece of this reinforcing wire (9) may be used, and plural pieces thereof may also be used. If one piece is used, the reinforcing wire (9), for example, may be used as it is, without braiding, or it may be used as a cord body which has been braided. Further, if plural pieces are used, the reinforcing wire (9) may be used by bundling together, or as cord body which has been bundled and braided.

A cord body (3) in forms of knitted cord, braided cord, plaited cord and such can be constructed by braiding with such braiding thread (2) which is gained. Concretely speaking, braiding with one or plural pieces of braiding thread (2), a cord body (3) in forms of knitted cord such as a roundly knitted cord and a squarely knitted cord, and of braided cord such as a roundly braided cord and a, squarely braided cord can be constructed. In addition to these, a cord body (3) in a shape of a double braided cord or a fasten cord can be constructed. In a case of braiding cords, a spontaneous braiding method wherein four, eight or sixteen of the braiding thread has been used.

The cord body (3) comprises the film made from PTFE (7) positioning on the outside. Since the packing (1) is constructed by a pressure forming of this cord body (3), the film made from PTFE (7) can be displaced on the surface of the packing (1).

Further, when constructing the cord body (3), the PVA layer (8) positioning on the outside of the cord body (3) can be removed after forming the cord body (3). Although the PVA layer (8), as mentioned afterwards, surpasses as a reinforcing material, as it has a characteristic which may easily cause a stress relaxation, removing of this layer can cause stress relaxation. And thus, it can make no stress relaxation to occur to the packing (1). Additionally, when is a reinforcing material necessary, is when the greatest tensile force acts to the expansive graphite sheet (6), i.e., when constructing the braiding thread (2) and when constructing the cord body (3), this, there will be no problem even if the PVA layer (8) is removed after constructing the cord body (3).

When removing the cord body (3), soaking of liquid resin to the cord body (3) is preferable. This is for a portion at where the PVA layer (8) existed to form a space when removing the PVA layer (8). If the cord body (3) is soaked in the liquid resin, the space can be filled with the liquid resin. By filling the space with the liquid resin, passing through of fluid from the inside of cord body (3) can be prevented when using the packing (1) inside of the stuffing box. Therefore, sealing ability of the packing (1) can be raised.

As for the liquid resin for soaking the cord body (3), the examples are fluorocarbon resin such as PTFE, silicone resin, water-soluble phenolic resin, and emulsion resin including inorganic pulverized powder such as glass, alumina, silica gel, graphite and titanium. Also, for the cord body (3), more than one or two liquid resin selected from a group comprising these liquid resin can be soaked into.

The packing (1) can be gained by a pressure forming of this cord body (3). The packing (1), for example, as mentioned in FIG. 5, is formed in a ring shape. The ring-formed packing (1) is packed into a stuffing box and used suitably as a packing for shaft sealing of fluid apparatus.

The packing (1), as mentioned previously, has a structure wherein the film made from PTFE (7) positions on the surface thereof. Therefore, the packing (1) can be made to have outstanding lubricating ability, abrasion resistance and corrosion resistance. Further, since the film made from PTFE (7) surpasses in electrical insulating ability, the electrolytic corrosion of the shaft and the apparatus casing can be prevented.

When compared to the one with the PVA layer (8) removed, the packing (1) with the PVA layer (8) can be produced without the removing operation, thus, it is not only possible to make the production easy, but also to lower the production costs.

On the other hand, the packing wherein the PVA layer (8) is removed has no ability of stress relaxation due to the PVA layer (8). Therefore, the sealing ability thereof can be raised more than that with PVA layer (8). Also, the packing (1) comprising the cord body (3) which is soaked with liquid resin after removing the PVA layer (8) is in a condition where the inside of the cord body (3) with no stress relaxing ability is filled fully, can raise its sealing ability more.

A producing method of the packing (1) set forth in the first embodiment will be explained in the next place.

This packing (1), as mentioned previously, is comprised of; a laminated sheet (5) constructed by laminating the film of PTFE (7) on one side of the expansive graphite sheet (6) and forming the PVA layer (8) on the other side thereof (1st Process); the strip laminated sheet (4) constructed by cutting this laminated sheet (5) (2nd Process); the braiding thread (2) constructed by a twist processing of this strip laminated sheet (4) so that the film made from PTFE (7) positions on the outside (3rd Process); the cord body (3) constructed by braiding with this braiding thread (2) (4th Process); and the cord body (3) being pressure formed at the end (5th Process).

The details of each process will be explained successively hereinafter.

The 1st process will be explained. When laminating the film made from PTFE (7) on one surface of the expansive graphite sheet (6), as mentioned previously, the laminating can be done with adhesive agents, heat fusion films and such. It is preferable to use the expansive graphite sheet (6) with unevenness in the crystal level on the surface thereof. From doing this, the expansive graphite sheet (6) can cause an anchor effect to heat fusion film for laminating the film made from PTFE (7) and to the PVA layer (8). By using such expansive graphite sheet (6), it becomes possible to satisfactorily laminate the film made from PTFE (7) and the PVA layer (8).

The nonwoven fabric-like PVA layer (8) is formed by spraying PVA water solution under hydraulic pressure on the other side of the expansive graphite sheet (6). By spraying PVA water solution with hydraulic pressure, the PVA water solution cakes like fiber on the expansive graphite sheet (6). At this time, each fiber cakes in a state of stretching toward irregular directions and reciprocally intertwining. Then, by carrying out of the spraying work for a certain period of time, fiber which is in a state of stretching toward irregular directions and reciprocally intertwining will accumulate and cake, and thus, the nonwoven fabric-like PVA layer (8) will be formed.

The 2nd process will be explained. The strip laminated sheet (4) is constructed by cutting this laminated sheet (5). At this time, when considering the following twist processing, it is preferable to cut the laminated sheet (5) with its width below 25 mm. Since the expansive graphite sheet (6) has a structure being reinforced on the both sides with the PVA layer (8) and with the film made from PTFE as mentioned previously, even with its width below 25 mm or even belong 10 mm, it can bear the tensile force occurs at the time of a twist processing. Furthermore, since the strip laminated sheet (4) has its structure being reinforced sufficiently on the both sides, it can be formed comparatively thin, and even with its width in the above mentioned range, it surpasses in flexibility and facilitates the twist processing.

The 3rd process will be explained. The braiding thread (2) is constructed by a twist processing of the strip laminated sheet (4). As previously mentioned, the strip laminated sheet (4) can withstand the tensile force occurs at the time of a twist processing, even with its width below 10 mm. Also, since the strip laminated sheet (4) with its width below 10 mm surpasses in flexibility, it can easily be twist processed. Due to the braiding thread (2) gained in such way surpassing in flexibility, a complex braiding can be done.

Additionally, it is possible to construct a braiding thread (2) which is reinforced with the reinforcing wire (9) as mentioned. In such case, the strip laminated sheet (4) may be twist processed so that the strip laminated sheet (4) covers the reinforcing wire (9). Then, the allowable tensile force of the braiding thread (2) can be raised.

The 4th process will be explained. The cord body (3) is constructed by using the above mentioned various braiding methods with this braiding thread (2). Since the braiding thread (2) surpasses in flexibility, a complex braiding can be done. Therefore, the cord body (3) gained from the braiding thread (2) surpasses in flexibility.

Additionally, as previously mentioned, the PVA layer (8) can be removed from the cord body (3) after constructing the cord body (3). As for a method for removing the PVA layer (8), a water bathing method can be mentioned. Since the PVA resin is water soluble synthetic resin, it can be easily and quickly dissolved and removed. By removing the PVA layer (8) in this way, the stress relaxation of the PVA layer (8) can be deprived from the cord body (3).

When removing the PVA layer (8), soaking of the cord body (3) with liquid resin for filling the space formed by the removing is preferable. From doing this, the space will be filled. Therefore, it becomes possible to gain a gland packing made from expansive graphite (1) with less stress relaxation and high sealing ability.

The 5th process will be explained. A packing (1) is constructed by a pressure forming of the cord body (3) in a mould. The shape of the packing (1) is not particularly restricted, but it is normally constructed in a ring-shape.

This is the end of a production process of the packing (1).

The following is to explain the second embodiment of the present invention with a reference made to the drawings.

Figure 8:
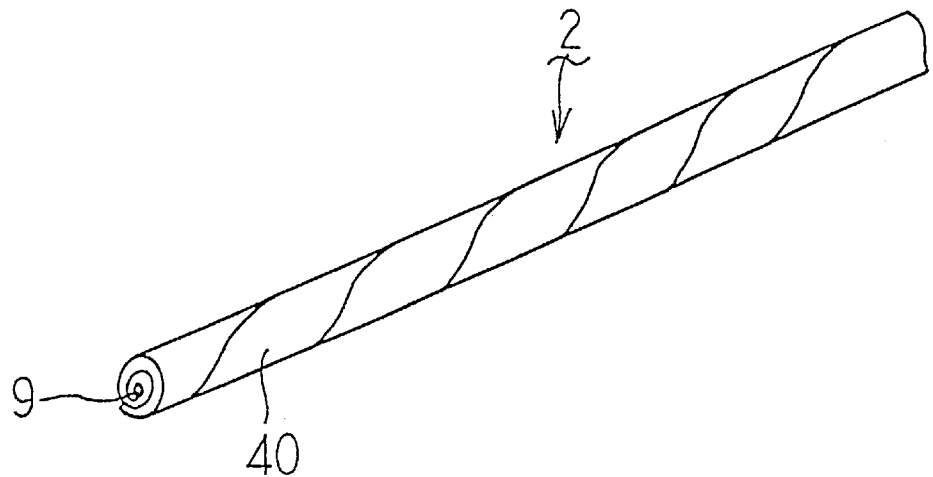
FIG. 8 is a perspective view showing braiding thread of the second embodiment of the present invention.
Figure 9:
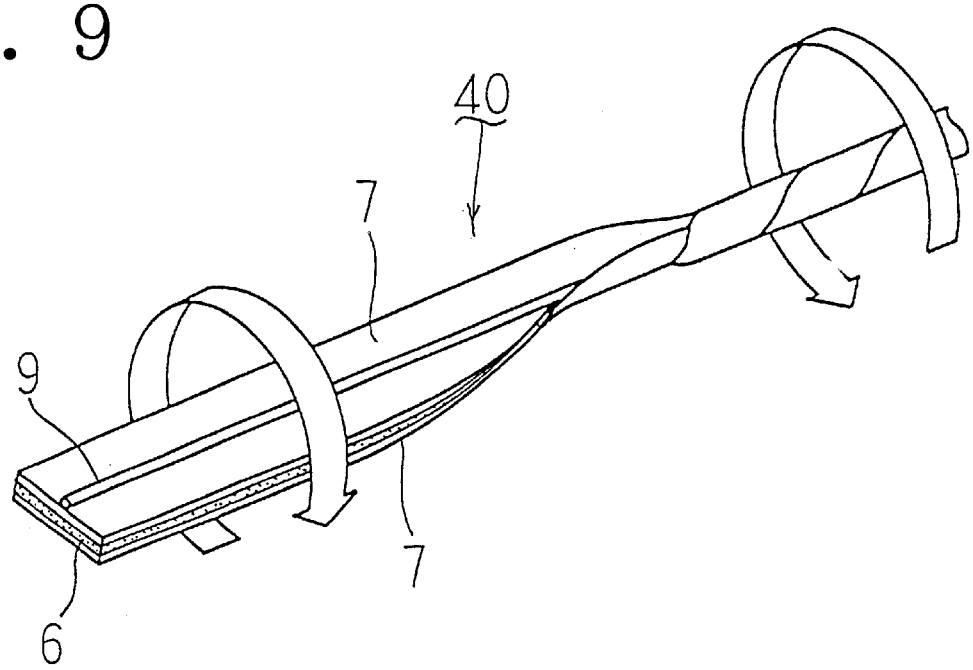
FIG. 9 is a view illustrating a producing process of the braiding thread shown in FIG. 8.
Figure 10:
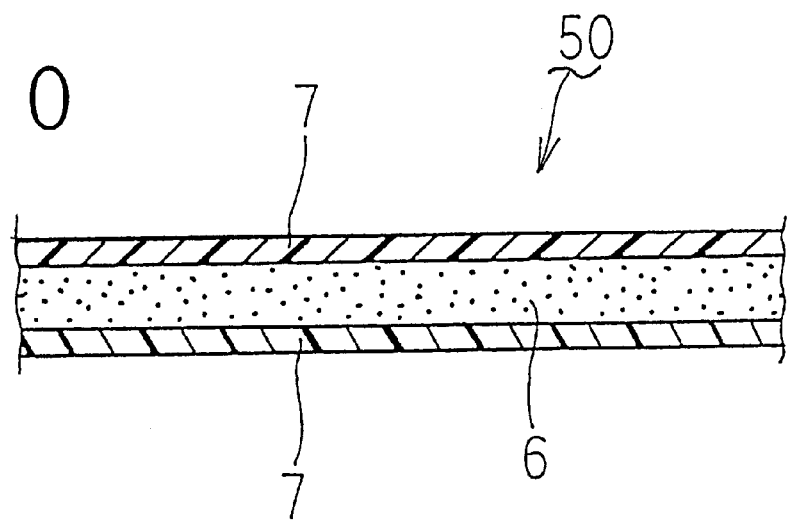
FIG. 10 is a sectional view showing a laminated sheet of the second embodiment of the present invention.

FIG. 8 is a perspective view showing braiding thread of the second embodiment. FIG. 9 is a view showing a production process of the braiding thread shown in FIG. 8. FIG. 10 is a sectional view showing a laminated sheet of the second embodiment. Additionally, a cord body will be explained with a reference made to FIG. 4 showing the first embodiment.

The difference of a gland packing made from expansive graphite (1) as set forth in the second embodiment to the one set forth in the first embodiment is the structure of the braiding thread (2), but the other structures thereof are almost the same as the first embodiment.

The structure of the braiding thread (2) will be explained hereinafter.

The braiding thread (2) is constructed with a strip laminated sheet (40) and the reinforcing wire (9).

The strip laminated sheet (40) is formed by cutting a laminated sheet (50) into strips. The laminated sheet (50) has a structure wherein the expansive graphite sheet (6) is laminated with the film made from PTFE (7) on one side or the both sides thereof. The FIG. 10 exemplifies a case wherein the film made from PTFE (7) is laminated on the both sides of the expansive graphite sheet (6).

The width of the strip laminated sheet (40) is set at above 10 mm, and is preferably 10 mm. When the width is below 10 mm, there may be a possibility of the strip laminated sheet (40) being not able to withstand the tensile force occurs at the time of a twist processing. On the other hand, if the width is above 10 mm, the strip laminated sheet (40) can withstand the tensile force occurs at the time of a twist processing. Additionally, it is preferable to have the width about 10 mm in order for the strip laminated sheet (40) to surpass in flexibility with great allowable tensile force.

Furthermore, the braiding thread (2), as shown in FIG. 8 and 9, is constructed by a twist processing of the strip laminated sheet (40), wherein the strip laminated sheet (40) covers the reinforcing wire (9) with the film made from PTFE (7) being on the outside. In this way, the allowable tensile force of the braiding thread (2) can be sufficiently made greater.

Since the gland packing made from expansive graphite (1) can be constructed from the strip laminated sheet (40) which not only has the great allowable tensile force but also surpasses in flexibility, it is possible to have the packing (1) to surpass in producing facility and sealing ability. Also, having the film made from PTFE (7) positioning on the outside, the gland packing made from expansive graphite (1) can be made to surpass in lubricating ability, abrasion resistance and corrosion resistance in the same way as the first embodiment. Further, the film made from PTFE (7) surpasses in electrical insulating ability, electrolytic corrosion of the shaft and the apparatus casing can be prevented.

The following is to explain a method for producing the packing set forth in the second embodiment.

This packing (1) is comprised of; a laminated sheet (50) constructed by laminating the film of PTFE (7) on one or both sides of the expansive graphite sheet (6) (1st Process); the strip laminated sheet (40) constructed by cutting this laminated sheet (50) (2nd Process); the braiding thread (2) constructed by a twist processing of said strip laminated sheet (40) so that this strip laminated sheet (40) covers the reinforcing wire (9) and the film made from PTFE (7) positions on the outside (3rd Process); the cord body (3)

constructed by braiding with this braiding thread (2) (4th Process); and the cord body (3) being pressure formed at the end (5th Process).

The 1st process will be explained. When laminating the film made from PTFE (7) on one or both sides of the expansive graphite sheet (6), the laminating can be done with adhesive agents, heat fusion films and such. It is preferable to use the expansive graphite sheet (6) with unevenness in the crystal level on the surface thereof. From doing this, the expansive graphite sheet (6) can cause an anchor effect to heat fusion film for laminating the film made from PTFE (7) and such. By using such expansive graphite sheet (6), it becomes possible to satisfactorily laminate the film made from PTFE (7).

Since the 2nd to 5th processes are the same as those of the first embodiment, the explanation thereof will be omitted.

With this producing method, the packing (1) can be produced from the strip laminated sheet (40) which allowable tensile force is great and surpasses in flexibility, the packing (1) can be easily produced. Also, there is no PVA layer (8), thus, there is no removing process thereof. Therefore, when compared to the case of removing the PVA layer (8) in the first embodiment, the producing process can be simplified.

The following is to explain the third embodiment of the present invention with a reference made to the drawings.

Figure 11:
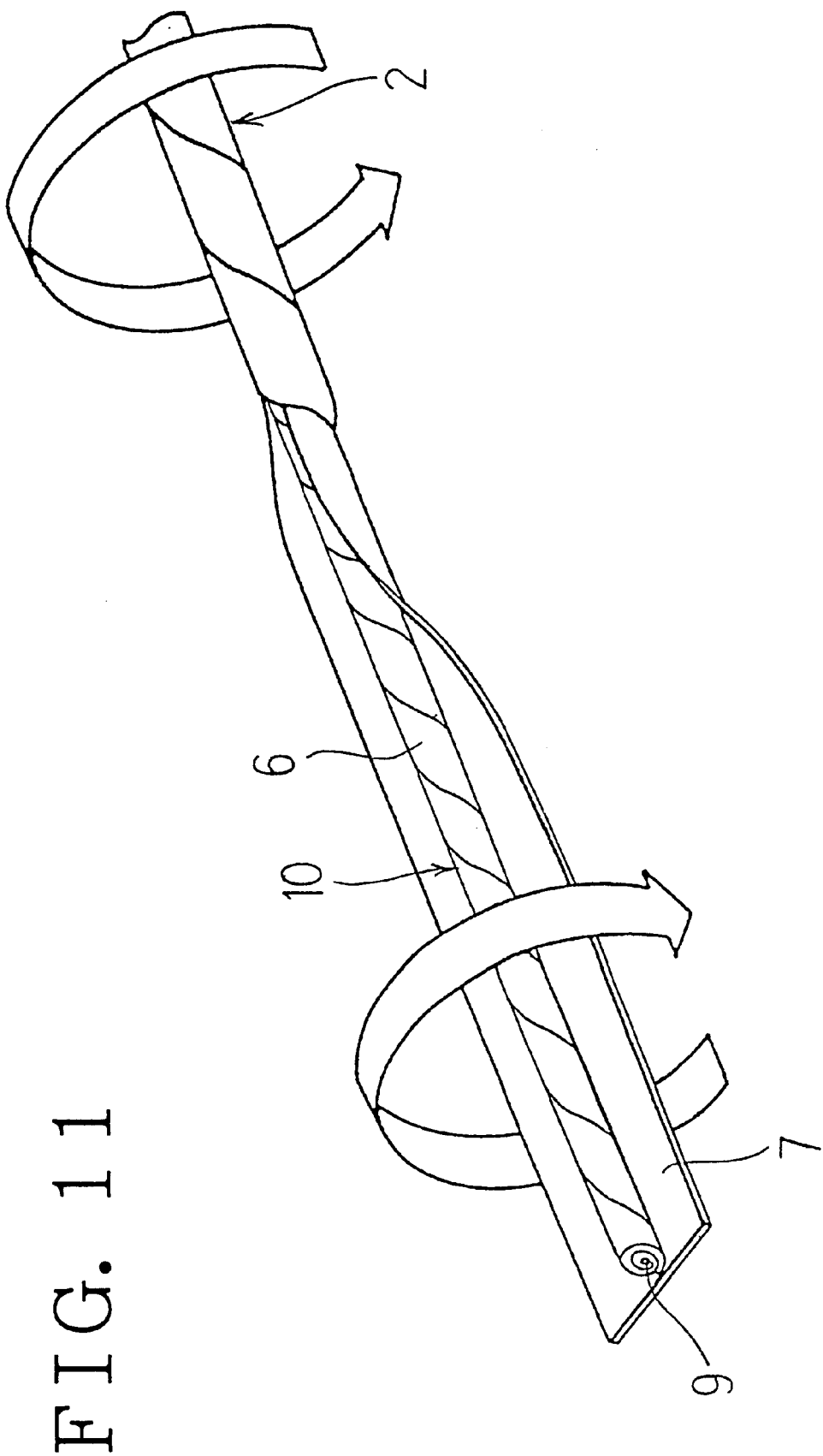
FIG. 11 is a perspective view illustrating a producing process of the braiding thread of the third embodiment of the present invention.

FIG. 11 is a view showing a producing process of braiding thread in the third embodiment. Additionally, a cord body will be explained with a reference made to FIG. 4 showing the first embodiment.

After pressure forming the strip expansive graphite sheet (6) with the reinforcing wire (9), this rolled material is twist processed, then the braiding thread (2) as set forth in the third embodiment is constructed by a twist processing of the strip-shaped film made from PTFE (7) so that this twist processed body (10) is covered.

The thickness of the expansive graphite sheet (6) used in this third embodiment is about 0.05~0.5 mm preferably. The reasons for this is that if it is below 0.05 mm, there may be a possibility of damaging the expansive graphite sheet (6) itself after a pressure rolling process due to the thickness being too thin. On the other hand, if the thickness is over 0.5 mm, it will be too thick even after going through the pressure rolling process, and it may cause inconveniences such as a difficulty in a twist processing.

This expansive graphite sheet (6) is cut into strips with a slitter and such, and the strip expansive graphite sheet (6) is produced in this way.

It is preferable to have 3~30 mm of the width of the strip expansive graphite sheet (6), and with such width, it can be easily and certainly pressure rolled together with the reinforcing wire (9).

This strip expansive graphite sheet (6) is pressure rolled by a pressure rolling roller and such, together with the reinforcing wire (9). By doing this, a rolled material wherein the reinforcing wire (9) is embedded along the orientation of shaft length within the expansive graphite sheet (6) is formed. After that, this rolled material becomes a twist processed body (10) (cf. FIG. 11) by a twist processing. Additionally, when gaining the twist processed body (10), either method of a single rolling which is to roll the rolled material for once or a double rolling which is to roll twice can be used.

The shape of section of reinforcing wire (9) is not particularly restricted. Also, the materials of the reinforcing wire (9) are not particularly restricted, but as examples, metals such as copper, stainless steel, inconel, monel, organic materials such as aramid, inorganic materials such as asbestos and glass can be used.

The diameter of the reinforcing wire (9) is not particularly restricted, but about 0.08~0.20 mm of diameter is preferable, and about 0.12~0.15 mm of diameter is more preferable. If the diameter is below 0.20 mm, it can certainly be embedded in the strip expansive graphite sheet (6), and said twist processing of the rolled material can easily be done.

The reasons for using the reinforcing wire (9) in the third embodiment are to produce rolled materials which can fully withstand a twist processing and to produce braiding thread which can fully withstand a braiding process (especially against a mechanical braiding).

In other words, since a rolled material or braiding thread in which only expansive graphite is used has low tensile strength, they are fragile and are easy to be torn and shrunk. Especially, such braiding thread cannot be used as braiding thread for a mechanical braiding. However, by constructing a rolled material wherein the reinforcing wire (9) is embedded within the expansive graphite sheet (6), great strength of the reinforcing wire (9) is given to the expansive graphite sheet (6), and thus, a rolled material and braiding thread which are suitable for a twist processing and a mechanical braiding.

The braiding thread (2) is produced by a twist processing of the strip film made from PTFE (7) with this twist processed body (10) being covered. With Said rolled material being twist processed as a single thread, the strip film made from PTFE (7) may be twist processed, or this strip film made from PTFE (7) may be twist processed with plural of said single thread being twisted together as twisted thread.

The strip film made from PTFE (7) is not only to improve the mechanical strength and lubricating ability of the braiding thread (2) but also to provide the braiding thread (2) the electrical insulating ability. As for the strip film made from PTFE (7), the one used in the first embodiment can be used, and more particularly, the film made from PTFE (7) which is porous can be suitably used.

Additionally, it is preferred to have the thickness of film made from PTFE (7) being 0.01~0.30 mm. This is because if the thickness is below 0.01 mm, sufficient insulating ability nor lubricating ability cannot be gained, and conversely, if the thickness is over 0.30 mm, sufficient flexibility cannot be gained.

The braiding thread (2) gained in such way will not easily tear nor shrink, and is braided with a braiding machine, so that the cord body (3) as exemplified in FIG. 4 will be gained.

By a pressure forming of this cord body (3), a ring shaped packing (1) as for an example (cf. FIG. 5) will be gained.

Since this gland packing made from expansive graphite (1) is constructed from the braiding thread (2) which not only has a big allowable tensile force but also surpasses in flexibility, it is possible to have the packing (1) to be easy to be produced and to surpass in sealing ability. Also, having the film made from PTFE (7) positioning on the outside, the gland packing made from expansive graphite (1) can be made to surpass in lubricating ability, abrasion resistance and corrosion resistance in the same way as the first embodiment. Further, the film made from PTFE (7) surpasses in electrical insulating ability, electrolytic corrosion of the shaft and the apparatus casing can be prevented.

The following is to explain the forth embodiment of the present invention with a reference made to the drawings.

Figure 12:
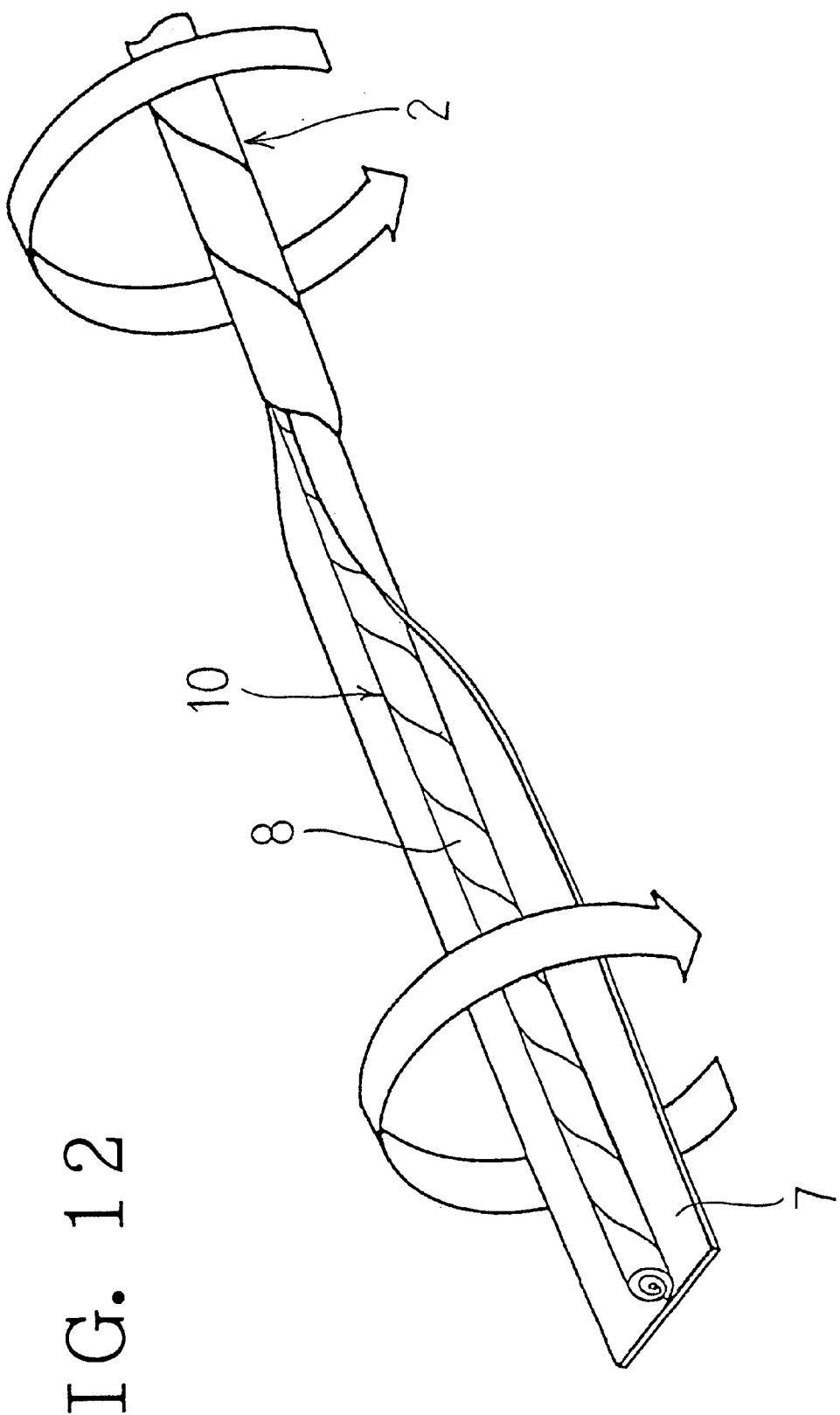
FIG. 12 is a perspective view illustrating a producing process of the braiding thread of the forth embodiment of the present invention.

FIG. 12 is a view showing a producing process of braiding thread of the forth embodiment.

The difference of a gland packing made from expansive graphite (1) as set forth in the forth embodiment to the one set forth in the third embodiment is the structure of the braiding thread (2), but a point wherein the braiding thread is pressure formed after it is braiding processed to form the cord body, in order to make it as a packing, is the same as the third embodiment.

The structure of the braiding thread (2) will be explained hereinafter.

The braiding thread (2) is constructed by a twist processing of a strip film made from PTFE (7) wherein a twist processed body which is obtained in a twist processing of strip laminated sheet (41) comprising the PVA layer (8) set at least on one side of expansive laminated sheet (not being illustrated) is covered. Additionally, FIG. 12 illustrates a case wherein the PVA layer (8) is set at least on one side of expansive laminated sheet (not being illustrated) and this PVA layer (8) positions on the outside.

The structure such as the thickness of the expansive laminated sheet and PVA layer (8) can be almost the same as those of said first embodiment. The laminated sheet comprising expansive graphite sheet (6) and PVA layer (8) is cut into strips to make a strip laminated sheet. Further, the thickness of the strip is not particularly restricted, but is exemplified as 5~30 mm, preferably 5~25 mm. As for this forth embodiment, since the expansive laminated sheet is reinforced with the PVA layer (8), it is possible to have the thickness of strip laminated sheet comparatively thin. Therefore, even with the thickness of strip about 30 mm, it is easily processed, and further it can withstand the tensile force occurs at the time of processing and can gain a strip laminated sheet with sufficient flexibility.

The braiding thread (2) can be produced by a twist processing of a strip film made from PTFE (7) wherein a twist processed body (10) which is obtained in a twist processing of the braiding thread (2) in the same way as the third embodiment is covered.

Then, the cord body (3) (cf. FIG. 4) can be obtained by braiding with this braiding thread (2). Following that, a ring shaped gland packing (1) exemplified in FIG. 1 as an example can be gained by a pressure forming of this cord body (3).

Each embodiment of the present invention has been explained in the above, however, the structures of the strip laminated sheet (4), the braiding thread (2), the cord body (3) and the packing (1) in the present invention are not restricted to the forms described in the above. For example, the strip laminated sheet (4) may be those gained by laminating the PVA layer (8) on one side of the expansive graphite sheet (6) or by laminating the PVA layer (8) on the both sides of the expansive graphite sheet (6). In both cases, the strip laminated sheet (4) can sheet (6), and with such width, it can be easily and certainly pressure rolled together with the reinforcing wire (9).

This strip expansive graphite sheet (6) is pressure rolled by a pressure rolling roller and such, together with the reinforcing wire (9). By doing this, a rolled material wherein the reinforcing wire (9) is embedded along the orientation of shaft length within the expansive graphite sheet (6) is formed. After that, this rolled material becomes a twist processed body (10) (cf. FIG. 11) by a twist processing. Additionally, when gaining the twist processed body (10), either method of a single rolling which is to roll the rolled material for once or a double rolling which is to roll twice can be used.

The shape of section of reinforcing wire (9) is not particularly restricted. Also, the materials of the reinforcing wire (9) are not particularly restricted, but as examples, metals such as copper, stainless steel, inconel, monel, organic materials such as aramid, inorganic materials such as asbestos and glass can be used.

The diameter of the reinforcing wire (9) is not particularly restricted, but about 0.08~0.20 mm of diameter is preferable, and about 0.12~0.15 mm of diameter is more preferable. If the diameter is below 0.20 mm, it can certainly be embedded in the strip expansive graphite sheet (6), and said twist processing of the rolled material can easily be done.

The reasons for using the reinforcing wire (9) in the third embodiment are to produce rolled materials which can fully withstand a twist processing and to produce braiding thread which can fully withstand a braiding process (especially against a mechanical braiding).

In other words, since a rolled material or braiding thread in which only expansive graphite is used has low tensile strength, they are fragile and are easy to be torn and shrunk. Especially, such braiding thread cannot be used as braiding thread for a mechanical braiding. However, by constructing a rolled material wherein the reinforcing wire (9) is embedded within the expansive graphite sheet (6), great strength of the reinforcing wire (9) is given to the expansive graphite sheet (6), and thus, a rolled material and braiding thread which are suitable for a twist processing and a mechanical braiding.

The braiding thread (2) is produced by a twist processing of the strip film made from PTFE (7) with this twist processed body (10) being covered. With Said rolled material being twist processed as a single thread, the strip film made from PTFE (7) may be twist processed, or this strip film made from PTFE (7) may be twist processed with plural of said single thread being twisted together as twisted thread.

The strip film made from PTFE (7) is not only to improve the mechanical strength and lubricating ability of the braiding thread (2) but also to provide the braiding thread (2) the electrical insulating ability. As for the strip film made from PTFE (7), the one used in the first embodiment can be used, and more particularly, the film made from PTFE (7) which is porous can be suitably used.

Additionally, it is preferred to have the thickness of film made from PTFE (7) being 0.01~0.30 mm. This is because if the thickness is below 0.01 mm, sufficient insulating ability nor lubricating ability cannot be gained, and conversely, if the thickness is over 0.30 mm, sufficient flexibility cannot be gained.

The braiding thread (2) gained in such way will not easily tear nor shrink, and is braided with a braiding machine, so that the cord body (3) as exemplified in FIG. 4 will be gained.

By a pressure forming of this cord body (3), a ring shaped packing (1) as for an example (cf. FIG. 5) will be gained.

Since this gland packing made from expansive graphite (1) is constructed from the braiding thread (2) which not only has a big allowable tensile force but also surpasses in flexibility, it is possible to have the packing (1) to be easy to be produced and to surpass in sealing ability. Also, having the film made from PTFE (7) positioning on the outside, the gland packing made from expansive graphite (1) can be made to surpass in lubricating ability, abrasion resistance and corrosion resistance in the same way as the first embodiment. Further, the film made from PTFE (7) surpasses in electrical insulating ability, electrolytic corrosion of the shaft and the apparatus casing can be prevented.

The following is to explain the forth embodiment of the present invention with a reference made to the drawings.

FIG. 12 is a view showing a producing process of braiding thread of the forth embodiment.

The difference of a gland packing made from expansive graphite (1) as set forth in the forth embodiment to the one set forth in the third embodiment is the structure of the braiding thread (2), but a point wherein the braiding thread is pressure formed after it is braiding processed to form the cord body, in order to make it as a packing, is the same as the third embodiment.

The structure of the braiding thread (2) will be explained hereinafter.

The braiding thread (2) is constructed by a twist processing of a strip film made from PTFE (7) wherein a twist processed body which is obtained in a twist processing of strip laminated sheet (41) comprising the PVA layer (8) set at least on one side of expansive laminated sheet (not being illustrated) is covered. Additionally, FIG. 12 illustrates a case wherein the PVA layer (8) is set at least on one side of expansive laminated sheet (not being illustrated) and this PVA layer (8) positions on the outside.

The structure such as the thickness of the expansive laminated sheet and PVA layer (8) can be almost the same as those of said first embodiment. The laminated sheet comprising expansive graphite sheet (6) and PVA layer (8) is cut into strips to make a strip laminated sheet. Further, the thickness of the strip is not particularly restricted, but is exemplified as 5~30 mm, preferably 5~25 mm. As for this forth embodiment, since the expansive laminated sheet is reinforced with the PVA layer (8), it is possible to have the thickness of strip laminated sheet comparatively thin. Therefore, even with the thickness of strip about 30 mm, it is easily processed, and further it can withstand the tensile force occurs at the time of processing and can gain a strip laminated sheet with sufficient flexibility.

The braiding thread (2) can be produced by a twist processing of a strip film made from PTFE (7) wherein a twist processed body (10) which is obtained in a twist processing of the braiding thread (2) in the same way as the third embodiment is covered.

Then, the cord body (3) (cf. FIG. 4) can be obtained by braiding with this braiding thread (2). Following that, a ring shaped gland packing (1) exemplified in FIG. 1 as an example can be gained by a pressure forming of this cord body (3).

Each embodiment of the present invention has been explained in the above, however, the structures of the strip laminated sheet (4), the braiding thread (2), the cord body (3) and the packing (1) in the present invention are not restricted to the forms described in the above. For example, the strip laminated sheet (4) may be those gained by laminating the PVA layer (8) on one side of the expansive graphite sheet (6) or by laminating the PVA layer (8) on the both sides of the expansive graphite sheet (6). In both cases, the strip laminated sheet (4) can also be formed comparatively thin because the expansive graphite sheet (6) is sufficiently reinforced. Therefore, even with the thickness of strip laminated sheet (4) being about 30 mm, it is easily processed, and further it can withstand the tensile force occurs at the time of processing.

Also, as for the first embodiment and forth embodiment, laminating of the PVA layer (8) may be done by spraying of the PVA water solution as mentioned previously, but a laminating method of the present invention is not restricted to this. For example, it is possible to form a nonwoven fabric-like PVA sheet (not being illustrated) by spraying the PVA water solution on a surface of a heated roller and to laminate this PVA sheet on the surface of expansive graphite sheet (6) by heat fusion. In such case, the temperature used for the heat fusion is preferably 185~195° C. If the temperature is below 185° C., there is a risk of having the fusion being insufficient, and on the other hand, if it is over 195° C., there is a risk of the nonwoven fabric-like organization being broken. Further, the PVA layer (8) does not have to be like a nonwoven fabric, and it may be in forms of a film or a mesh. If it is a case of PVA layer (8) being in a film form, the previously formed PVA resin in the film form, may be laminated on the expansive graphite sheet (6) by heat fusion. Furthermore, if it is a case of PVA layer (8) being in a mesh form, the previously formed PVA resin in the mesh form, may be laminated on the expansive graphite sheet (6) by heat fusion.

Embodiments

The following is to explain the embodiments of the present invention. However, the present invention is not particularly restricted to these embodiments.

[Tensile Test of Laminated Sheet]

(Embodiment)

Figure 13:
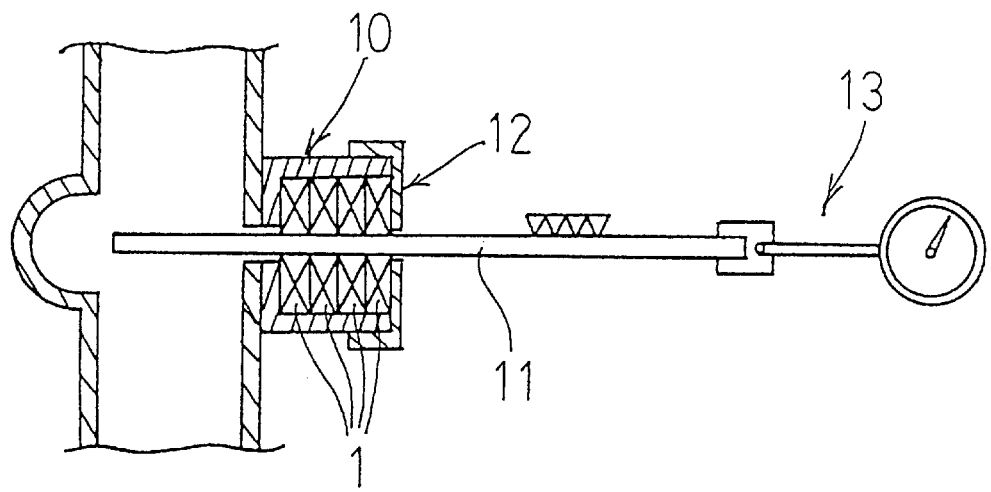
FIG. 13 is a view illustrating the size of laminated sheet supplied for a tensile test.

A laminated sheet was constructed by laminating a film made from PTFE of its thickness 0.03 mm using a heat fusing film on a surface of expansive graphite sheet of its thickness 0.2 mm and density 1.1 g/cm$^3$, together with laminating on the other side a nonwoven fabric-like PVA layer which was formed by spraying PVA water solution with 60 weight % of content of PVA resin and under hydraulic pressure. Then, a test strip (14) was constructed by cutting this laminated sheet into the size shown in FIG. 13. The unit of length used in FIG. 13 is mm.

Also, as for a film made from PTFE, a porous film having fine pores of diameter being about 0.05~15 μm was used.

Comparative Test

A laminated sheet was constructed by laminating a cotton woven fabric sheet of its thickness 0.15 mm using a heat fusing film on both surfaces of expansive graphite sheet of its thickness 0.2 mm and density 1.0 g/cm$^3$. Then, a test strip (14) was constructed by cutting this laminated sheet into the size shown in FIG. 13.

Four of each test strip (14) set forth in the embodiment and the comparative test were prepared, and for these test strips, a tensile force tests based on JIS K 6301$^{-1975}$ (property testing method of vulcanized rubber) was carried out indoors at a temperature 22° C. Further, as for a tensile tester, a resin tensile tester produced by Toyoseiki Co. Ltd. is used.

The test result of the embodiment is shown in Table 1, and the test result of the comparative test is shown in Table 2.

TABLE 1

| Embodiment No. | Tensile Strength (N/mm$^2$) | |
|---|---|---|
| | Measured Value | Average Value |
| 1 | 3.9 | 3.9 |
| 2 | 3.8 | |
| 3 | 4.5 | |
| 4 | 3.3 | |

TABLE 2

| Embodiment No. | Tensile Strength (N/mm$^2$) | |
| --- | --- | --- |
| | Measured Value | Average Value |
| 1 | 2.8 | 2.8 |
| 2 | 2.7 | |
| 3 | 2.7 | |
| 4 | 2.9 | |

From the above results, it is clear that the tensile strength of the embodiment wherein the PVA layer and the film made from PTFE are used as reinforcing materials are obviously greater than those of the comparative Test wherein the cotton woven fabric is used as a reinforcing material.

[Torque Test of Gland Packing Made From Expansive Black Lead]

(Embodiment)

A laminated sheet was constructed by laminating a film made from PTFE of its thickness 0.03 mm using a heat fusing film on a surface of expansive graphite sheet of its thickness 0.2 mm and density 1.0 g/cm$^3$, together with laminating a nonwoven fabric-like PVA layer which is formed by spraying PVA water solution on the other side. Then, a strip laminated sheet (14) was constructed by cutting this laminated sheet into the width of 10 mm. Then, braiding thread was formed by a twist processing of this strip laminated sheet, and a cord body is constructed by braiding with this braiding thread, and finally, this is pressure formed in order to construct a gland packing made from expansive graphite.

Also, as for a film made from PTFE, a porous film having fine pores of diameter being about 0.05~15 μm was used.

Furthermore, the size of the gland packing made from expansive graphite was to be $\emptyset_1 8 \times \emptyset_2 18 \times t6$ ($\emptyset_1$: inside diameter, $\emptyset_2$: outside diameter, t: thickness (The unit for all of these is mm.)).

Comparative Test

A laminated sheet was constructed by laminating a cotton woven fabric sheet of its thickness 0.15 mm using a heat fusing film on both surfaces of expansive graphite sheet of its thickness 0.2 mm and density 1.0 g/cm$^3$. Then, a strip laminated sheet (14) was constructed by cutting this laminated sheet into the thickness of 10 mm. Then, braiding thread was formed by a twist processing of this strip laminated sheet, and a cord body is constructed by braiding with this braiding thread, and finally, this is pressure formed in order to construct a gland packing made from expansive graphite.

Furthermore, the size of the gland packing made from expansive graphite was to be $\emptyset_1 8 \times \emptyset_2 18 \times t6$ ($\emptyset_1$: inside diameter, $\emptyset_2$: outside diameter, t: thickness (The unit for all of these is mm.)).

Figure 14:
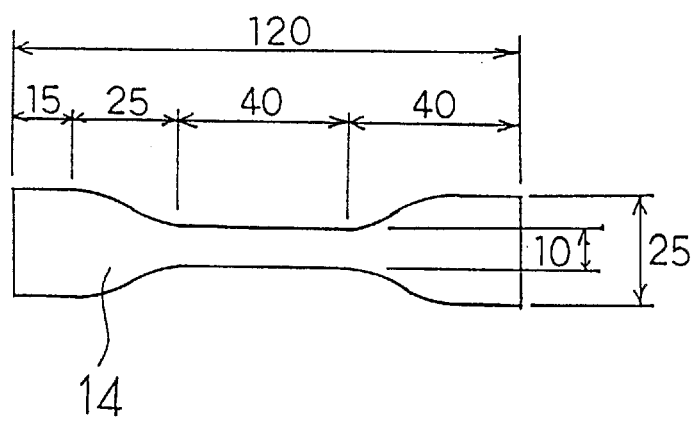
FIG. 14 is a view illustrating a testing situation of a torque test.

FIG. 14 is a view showing a situation of the embodiment of the torque test. As for carrying out of the torque test, four of gland packing made from expansive graphite (1) of the present invention was prepared, and these four gland packing made from expansive graphite (1) were set and displaced in a stuffing box (10) of fluid apparatus indoors at temperature 22° C. Then, a spindle (11) made from SUS304 with shaft diameter Ø8 (the unit is mm) was inserted into a shaft inserting bore of the gland packing made from expansive graphite (1). Then, a locknut (12) was locked with locking pressure of 2000 kg/cm$^2$, so that each gland packing made from expansive graphite (1) was pressure welded to the inside wall surface of the spindle (11) and a stuffing box (10). Then, the spindle (11) was pulled with a spring balance (13), and the tensile force (which is equal to the maximum frictional force between the spindle and the packing) occurred when the spindle (11) which had started to move was measured. The same test was carried out for the gland packing made from expansive graphite (1) set forth in the comparative test. The test result of the embodiment is shown in Table 3, and the test result of the comparative test is shown in Table 4.

TABLE 3

| Embodiment No. | Tensile Force (Kg) | |
| --- | --- | --- |
| | Measured Value | Average Value |
| 1 | 1.5 | 1.60 |
| 2 | 1.7 | |
| 3 | 1.6 | |
| 4 | 1.6 | |

TABLE 4

| Embodiment No. | Tensile Force (Kg) | |
| --- | --- | --- |
| | Measured Value | Average Value |
| 1 | 1.8 | 1.975 |
| 2 | 1.9 | |
| 3 | 2.0 | |
| 4 | 2.2 | |

From the results, it is clear that the tensile force of the embodiment wherein the PVA layer and the film made from PTFE are used as reinforcing materials are less than those of the comparative Test wherein the cotton woven fabric is used as a reinforcing material. This indicates that the lubricating ability of the gland packing made from expansive graphite set forth in the embodiment is good. Therefore, when turning a spindle inserted into a packing, it is found that using of the gland packing made from expansive graphite (1) can turn a spindle with low torque.

From the above results, it is clear that the tensile force of the embodiment wherein the PVA layer and the film made from PTFE are used as reinforcing materials are less than those of the comparative Test wherein the cotton woven fabric is used as a reinforcing material. This indicates that the lubricating ability of the gland packing made from expansive graphite set forth in the embodiment is good. Therefore, when turning a spindle inserted into a packing, it is found that using of the gland packing made from expansive graphite (1) can turn a spindle with low torque.

The present invention as set forth in claim 1 is braiding thread used in a gland packing made from expansive graphite which is gained by a pressure forming of a cord body constructed by braiding with the braiding thread wherein: a strip laminated sheet comprising an expansive graphite sheet laminated with a film made from polytetrafluoroethylene on one side thereof and is set with polyvinylalcohol layer on the other side thereof, is twist processed so that the film made from polytetrafluoroethylene positions on the outside, thus, it has the following effects.

That is, since this braiding thread can be constructed from the strip laminated sheet which surpasses in flexibility with the strip width below 30 mm, the braiding thread can also be made surpass in flexibility. Therefore, a complicated braiding processing can easily be carried out. Also, the allowable tensile force of the strip laminated sheet for constructing this braiding thread, thus, there is no risk of tearing at the time of a twist processing and a braiding processing. Further, since this braiding thread is twist processed so that the film made from polytetrafluoroethylene positions on the outside thereof, when constructing a packing, the film made from polytetrafluoroethylene can be displaced on the surface thereof. Therefore, it is possible to obtain a packing which surpasses in lubricating ability, abrasion resistance and corrosion resistance. Furthermore, the film made from polytetrafluoroethylene surpasses in electrical insulating ability, it is possible to obtain a packing which surpasses in electrical insulating ability, so that electrolytic corrosion of the shaft and the apparatus casing can be prevented.

The present invention as set forth in claim 2 is braiding thread used in a gland packing made from expansive graphite which is gained by a pressure forming of a cord body constructed by braiding with the braiding thread, wherein: a strip laminated sheet comprising an expansive graphite sheet laminated with polyvinylalcohol layer at leaset on one side thereof, is twist processed so that the polyvinylalcohol layer positions on the outside, thus, it has the following effects.

That is, in the same way as claim 1, the braiding thread can be made surpass in flexibility, and a complicated braiding processing can easily be carried out. Also, the allowable tensile force of the strip laminated sheet for constructing this braiding thread, thus, there is no risk of tearing at the time of a twist processing and a braiding processing. Further, since this braiding thread is twist processed so that a polyvinylalcohol layer positions on the outside thereof, when constructing a packing, the polyvinylalcohol layer can be displaced on the surface thereof. Therefore, it is possible to obtain a packing which surpasses in abrasion resistance and corrosion resistance. Furthermore, the polyvinylalcohol layer surpasses in electrical insulating ability, it is possible to obtain a packing which surpasses in electrical insulating ability.

The present invention as set forth in claim 5 is braiding thread used in a gland packing made from expansive graphite which is gained by a pressure forming of a cord body constructed by braiding with the braiding thread wherein: a strip laminated sheet is twist processed so that said laminated sheet wherein a film made from polytetrafluoroethylene is laminated on at least one side of the expansive graphite sheet covers a reinforcing wire with the film made from polytetrafluoroethylene positioning on the outside, thus, it has the following effects.

That is, since this braiding thread can be constructed from the strip laminated sheet with the strip width about 10 mm, the braiding thread can also be made surpass in flexibility. Therefore, a complicated braiding processing can easily be carried out. Also, the allowable tensile force of the strip laminated sheet for constructing this braiding thread, thus, there is no risk of tearing at the time of a twist processing and a braiding processing. Further, since this braiding thread is twist processed so that the film made from polytetrafluoroethylene positions on the outside thereof, when constructing a packing, the film made from polytetrafluoroethylene can be displaced on the surface thereof. Therefore, it is possible to obtain a packing which surpasses in lubricating ability, abrasion resistance and corrosion resistance. Furthermore, the film made from polytetrafluoroethylene surpasses in electrical insulating ability, it is possible to obtain a packing which surpasses in electrical insulating ability, so that electrolytic corrosion of the shaft and the apparatus casing can be prevented.

The present invention as set forth in claim 6 is braiding thread used in a gland packing made from expansive graphite which is gained by a pressure forming of a cord body constructed by braiding with the braiding thread wherein: a strip film made from polytetrafluoroethylene is twist processed so that it covers a twist processed body of a rolled material which is gained by rolling a strip expansive graphite sheet together with a reinforcing wire, thus, it has the following effects.

That is, since the braiding thread can be made surpass in flexibility with great allowable tensile force, it is possible to obtain a gland packing made from expansive graphite which surpasses in producing facility and sealing ability. Also, since the film made from PTFE positions on the outside, it is possible to obtain a packing which surpasses in lubricating ability, abrasion resistance, corrosion resistance and electrical insulating ability.

The present invention as set forth in claim 7 is braiding thread used in a gland packing made from expansive graphite which is gained by a pressure forming of a cord body constructed by braiding with the braiding thread wherein: a strip film made from polytetrafluoroethylene is twist processed so that it covers a twist processed body of a strip laminated sheet wherein at least one side of the expansive graphite sheet is set with a polyvinylalcohol layer, thus, it has the following effects.

That is, since the braiding thread can be made surpass in flexibility with great allowable tensile force, it is possible to obtain a gland packing made from expansive graphite which surpasses in producing facility and sealing ability. Also, since the film made from PTFE positions on the outside, it is possible to obtain a packing which surpasses in lubricating ability, abrasion resistance, corrosion resistance and electrical insulating ability.

The present invention as set forth in claim 8 is a cord body wherein braiding thread set forth in claim 1 is braided, thus, it has the following effects. That is, by constructing from the braiding thread which has great allowable tensile force and also surpasses in flexibility, the cord body can be made to have no tearing parts even after a complicated braiding processing and to surpass in flexibility. Further, since the film made from polytetrafluoroethylene or the polyvinylalcohol layer positions on the outside of the cord body, the film made from polytetrafluoroethylene or the polyvinylalcohol layer can be displaced on the surface of a packing. Therefore, it is possible to obtain a gland packing made from expansive graphite which surpasses in abrasion resistance and corrosion resistance. Furthermore, the film made from polytetrafluoroethylene surpasses in electrical insulating ability, it is possible to obtain a packing which surpasses in electrical insulating ability, so that electrolytic corrosion of the shaft and the apparatus casing can be prevented.

The present invention as set forth in claim 15 is a cord body wherein braiding thread set forth in claim 1 is braided, and said polyvinylalcohol layer is removed after said braiding processing, thus, it has the following effects. That is, by removing the polyvinylalcohol layer which easily cause stress relaxation, a cord body which does not cause stress relaxation. Thus, it is able to make a packing to cause no stress relaxation and to raise sealing ability of the packing.

The present invention as set forth in claim 18 is a cord body set forth in claim 15, wherein more than one or two of liquid resin selected from a groups comprising flurocarbon resin like polytetrafluoroethylene resin and such, silicone resin, water-soluble phenolic resin, and emulsion resin including inorganic pulverized powder such as glass, alumina, silica gel, graphite and titanium, are impregnated, thus, it has the following effects. That is, space formed from removing the polyvinylalcohol layer can be filled with the liquid resin. By filling the space with the liquid resin, fluid can be prevented from passing through the inner portion of the cord body when using a packing in a stuffing box, raising the sealing ability even more.

The present invention as set forth in claim 21 is a gland packing made from expansive graphite which is produced by pressure forming a cord body set forth in claim 8, thus, it has the following effects. That is, by structuring from a cord body which surpasses in flexibility with no tearing parts, a packing can be made surpass in sealing ability. Also, in a case of the film made from polytetrafluoroethylene or the polyvinylalcohol layer positioning on the outside of a packing, the packing can be made surpass in abrasion resistance and corrosion resistance. Further, since the film made from polytetrafluoroethylene surpasses also in lubricating ability and electrical insulating ability, the packing can be made surpass in lubricating ability and electrical insulating ability, so that electrolytic corrosion of the shaft and the apparatus casing can be prevented. Furthermore, since it is constructed from a laminated sheet which surpasses in flexibility with great allowable tensile force, the packing surpasses in producing ability.

The present invention as set forth in claim 34 is a A producing method of gland packing made from expansive graphite wherein: a laminated sheet is constructed by laminating a film made from polytetrafluoroethylene on one side of an expansive graphite sheet and forming a polyvinylalcohol layer on the other side; a strip laminated sheet is formed by cutting this laminated sheet; braiding thread is constructed by twist processing this strip laminated sheet so that the film made from polytetrafluoroethylene positions on the outside; a cord body is constructed by braiding with this braiding thread; after elusively removing polyvinylalcohol from said cord body by washing the cord body with hot water, the cord body is dried; and after this, the cord body is pressure formed, thus, it has the following effects.

That is, it can be constructed from the strip laminated sheet which surpasses in flexibility with great allowable tensile force, so that a twist processing and a braiding processing can easily be carried out for producing a packing easily. Also, the film made from polytetrafluoroethylene can be displaced on the surface of a packing, so that the packing can be made surpass in lubricating ability, abrasion resistance and corrosion resistance. Further, since the film made from polytetrafluoroethylene surpasses also in electrical insulating ability, it is possible to have the packing which surpasses in electrical insulating ability, so that electrolytic corrosion of the shaft and the apparatus casing can be prevented. Furthermore, by removing the polyvinylalcohol layer which easily cause stress relaxation, the packing can be made not to cause stress relaxation and to raise its sealing ability.

Since the present invention as set forth in claim 35 is a producing method of gland packing made from expansive graphite as set forth in claim 12, wherein: after drying a cord body which has been elusively removed, more than one or two of liquid resin selected form a group comprising flurocarbon resin like polytetrafluoroethylene resin and such, silicone resin, water-soluble phenolic resin, and emulsion resin including inorganic pulverized powder such as glass, alumina, silica gel, graphite and titanium, is impregnated; and after this, the cord body is pressure formed, thus, it has the following effects, space formed from removing the polyvinylalcohol layer can be filled with the liquid resin. Thus, fluid can be prevented from passing through the inner portion of the cord body when using a packing in a stuffing box, raising the sealing ability even more.

The present invention as set forth in claim 36 is a producing method of gland packing made from expansive graphite wherein: a strip laminated sheet is constructed by cutting a laminated sheet wherein a polyvinylalcohol layer is set on at least one side of an expansive graphite sheet; braiding thread is constructed by twist processing said strip laminated sheet so that said laminated sheet covers a reinforcing wire, and that the polyvinylalcohol layer positions on the outside; a cord body is constructed by braiding with this braiding thread; and after this, this cord body is pressure formed, thus, it has the following effects.

That is, it can be constructed from the strip laminated sheet which surpasses in flexibility with great allowable tensile force, so that a twist processing and a braiding processing can easily be carried out for producing a packing easily. Also, the polyvinylalcohol layer can be displaced on the surface of a packing, so that the packing can be made surpass in abrasion resistance and corrosion resistance. Further, since the polyvinylalcohol layer surpasses also in electrical insulating ability, it is possible to have the packing which surpasses in electrical insulating ability, so that electrolytic corrosion of the shaft and the apparatus casing can be prevented.

The present invention as set forth in claim 37 is a producing method of gland packing made from expansive graphite wherein: a strip laminated sheet is constructed by cutting a laminated sheet wherein a film made from polytetrafluoroethylene is laminated on at least one side of an expansive graphite sheet; braiding thread is constructed by twist processing said strip laminated sheet so that said laminated sheet covers a reinforcing wire, and that the film made from polytetrafluoroethylene positions on the outside; a cord body is constructed by braiding with this braiding thread; and after this, this cord body is pressure formed, thus, it has the following effects.

That is, it can be constructed from the strip laminated sheet which surpasses in flexibility with great allowable tensile force, so that a twist processing and a braiding processing can easily be carried out for producing a packing easily. Also, the film made from polytetrafluoroethylene can be displaced on the surface of a packing, so that the packing can be made surpass in lubricating ability, abrasion resistance and corrosion resistance. Further, since the film made from polytetrafluoroethylene surpasses also in electrical insulating ability, it is possible to have the packing which surpasses in electrical insulating ability, so that electrolytic corrosion of the shaft and the apparatus casing can be prevented.

What is claimed is:

1. Braiding thread used in a gland packing made from expansive graphite which is gained by a pressure forming of a cord body constructed by braiding with the braiding thread wherein:

a strip laminated sheet comprising an expansive graphite sheet laminated with a film made from polytetrafluoroethylene on one side thereof and is set with a polyvinylalcohol layer on the other side thereof is twist processed so that the film made from polytetrafluoroethylene positions on the outside.

2. The braiding thread as set forth in claim 1, wherein said strip laminated sheet is twist processed so that said laminated sheet covers a reinforcing wire.

3. A cord body wherein braiding thread set forth in claim 1 is braided.

4. A cord body wherein braiding thread set forth in claim 3 is braided.

5. A cord body wherein braiding thread set forth in claim 1 is braided, and said polyvinylalcohol layer is removed after said braiding processing.

6. A cord body wherein braiding thread set forth in claim 3 is braided, and said polyvinylalcohol layer is removed after said braiding processing.

7. A cord body set forth in claim 5 wherein more than one or two of liquid resin selected from a group comprising fluorocarbon resin like polytetrafluoroethylene resin and such, silicone resin, water-soluble phenolic resin, and emulsion resin including inorganic pulverized powder such as glass, alumina, silica gel, graphite and titanium, are impregnated.

8. A cord body set forth in claim 6 wherein more than one or two of liquid resin selected from a group comprising fluorocarbon resin like polytetrafluoroethylene resin and such, silicone resin, water-soluble phenolic resin, and emulsion resin including inorganic pulverized powder such as glass, alumina, silica gel, graphite and titanium, are impregnated.

* * * * *